P. A. E. ARMSTRONG.
COMBINED THRUST AND JOURNAL ROLLER BEARING.
APPLICATION FILED MAY 1, 1920.
1,376,311.
Patented Apr. 26, 1921.
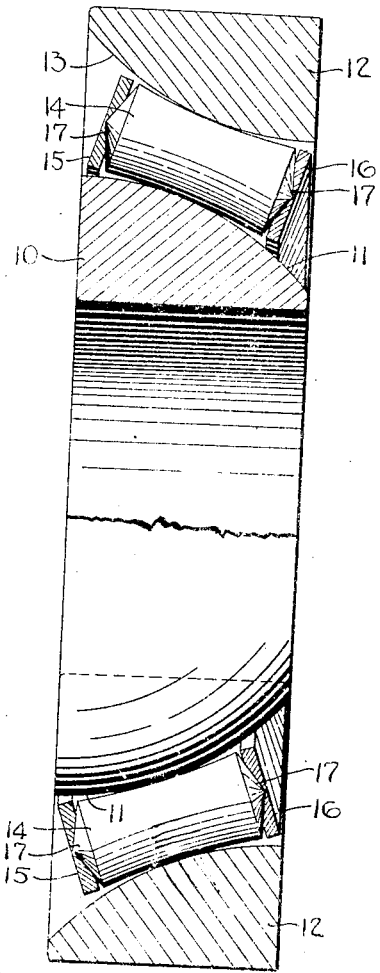
INVENTOR
P.A.E.Armstrong.
BY
F. H. Dyke
ATTORNEY

UNITED STATES PATENT OFFICE.

PERCY A. E. ARMSTRONG, OF LOUDONVILLE, NEW YORK.

COMBINED THRUST AND JOURNAL ROLLER-BEARING.

1,376,311.   Specification of Letters Patent.   Patented Apr. 26, 1921.

Original application filed June 13, 1919, Serial No. 303,886. Divided and this application filed May 1, 1920. Serial No. 378,044.

*To all whom it may concern:*

Be it known that I, PERCY A. E. ARMSTRONG, a subject of the King of Great Britain, and residing at Loudonville, in the county of Albany, State of New York, have invented certain new and useful Improvements in Combined Thrust and Journal Roller-Bearings, of which the following is a specification.

My invention relates to roller bearings adapted to serve both as a thrust bearing and a journal bearing. This application is a division of my application Serial No. 303,886, filed June 13, 1919.

The single figure of the drawing is a cross-sectional view of a bearing in accordance with my invention, with parts broken away.

The inner race member 10 increases progressively in diameter from one side to the other, and its outer surface 11 is transversely curved to provide a roller race. In order that the bearing may be self-alining, the curvature of the bearing surface 11 is spherical or substantially spherical.

The outer race member 12 is annular in form and is provided with an opening also progressively increasing in diameter from one side to the other, and its inner surface 13 is transversely curved.

A plurality of rollers 14 run between the races 11 and 13 and such rollers are longitudinally concaved on a radius larger than the radius of the transverse convex curvature of race surfaces 11 and 13.

In this way the bearing engagement is confined to a relatively narrow region at about the middle of rollers 14, and the bearing runs freely and can not bind.

The cage for the rollers in the form shown consists of a pair of rings 15, 16 having suitable seats to engage the conical ends 17 of the rollers 14. Other forms of cages and of roller ends may be used. This form of bearing serves as a journal bearing and also as a thrust bearing, is readily constructed and assembled, and is self-alining and well adapted for many bearing purposes.

I claim:

1. A combined radial and thrust roller bearing comprising an inner race member having a convex transversely curved bearing surface of progressively increasing diameter from one side to the other, an annular outer race member having an opening therein of progressively increasing diameter from one side to the other, the increase in diameter being in the same direction in each case, said outer member having an inner transversely curved bearing surface, and a plurality of rollers between said bearing surfaces, said rollers having their axes converging in substantially a cone having its apex in the bearing axis, and said rollers being longitudinally concaved on a radius substantially greater than the radius of convex curvature of the bearing surfaces, whereby the bearing contact is confined to a relatively narrow region at about the middle of the rollers.

2. A bearing as claimed in claim 1 and in which the inner bearing member has a spherical curvature, whereby the bearing is self-alining.

In witness whereof, I have signed my name hereto.

PERCY A. E. ARMSTRONG.